United States Patent
Willmann

[11] Patent Number: 5,217,284
[45] Date of Patent: Jun. 8, 1993

[54] HYDRAULIC DUAL-CIRCUIT BRAKE SYSTEM WITH DUAL PRESSURE SENSORS AND AN ACTIVE FLUID RESERVOIR

[75] Inventor: Karl-Heinz Willmann, Freiberg/N, Fed. Rep. of Germany

[73] Assignee: Robert Bosch GmbH, Stuttgart, Fed. Rep. of Germany

[21] Appl. No.: 947,353

[22] Filed: Sep. 18, 1992

Related U.S. Application Data

[63] Continuation of Ser. No. 674,805, Mar. 25, 1991, abandoned.

[30] Foreign Application Priority Data

May 21, 1990 [DE] Fed. Rep. of Germany ....... 4016308

[51] Int. Cl.[5] .......................... B60T 8/32; B60K 28/16
[52] U.S. Cl. .................................. 303/113.2; 303/11; 303/DIG. 2; 303/DIG. 4; 303/116.2
[58] Field of Search ............... 303/116.1, 116.2, 113.2, 303/DIG. 1–DIG. 4, 11, 10

[56] References Cited

U.S. PATENT DOCUMENTS

| | | | |
|---|---|---|---|
| 3,836,206 | 9/1974 | Leiber | 303/DIG. 3 X |
| 4,807,944 | 2/1989 | Weise | 303/DIG. 3 X |
| 4,824,183 | 4/1989 | Uchida et al. | 303/116 R X |
| 4,846,532 | 7/1989 | Friedow et al. | 303/113 T R |
| 4,900,105 | 2/1990 | Burgdorf et al. | 303/113 T R X |
| 4,950,028 | 8/1990 | Harrison | 303/113 T R |
| 5,033,800 | 7/1991 | Willmann | 303/116 R X |

FOREIGN PATENT DOCUMENTS

| | | | |
|---|---|---|---|
| 0062246 | 10/1985 | European Pat. Off. | |
| 2218479 | 11/1989 | United Kingdom | 303/116 R |

Primary Examiner—Matthew C. Graham
Assistant Examiner—Josie A. Ballato
Attorney, Agent, or Firm—Edwin E. Greigg; Ronald E. Greigg

[57] ABSTRACT

A hydraulic dual-circuit brake system with front/rear brake circuit distribution, an anti-skid system (ABS) and traction control (ASR) for motor vehicles including a four-channel hydraulic unit with control valves and with one return pump and a separate pump element for each brake circuit. An apparatus to supply brake pressure to the rear axle brake circuit in traction control has a reversing valve, which in traction control disconnects the rear-axle brake circuit from the master brake cylinder, and a pump feed apparatus, which upon activation feeds brake fluid into the pump element of the rear axle brake circuit. For ideal brake force distribution between the front and rear axles, an electric control system upon brake pedal actuation, switches the reversing valve over to its closing position, turns on the return pump, and activates the pump feed apparatus, at least until such time as the brake pressure generated in the rear axle brake circuit by the pump element is equivalent to a set-point value predetermined as a function of the brake pressure in the front axle brake circuit.

4 Claims, 1 Drawing Sheet

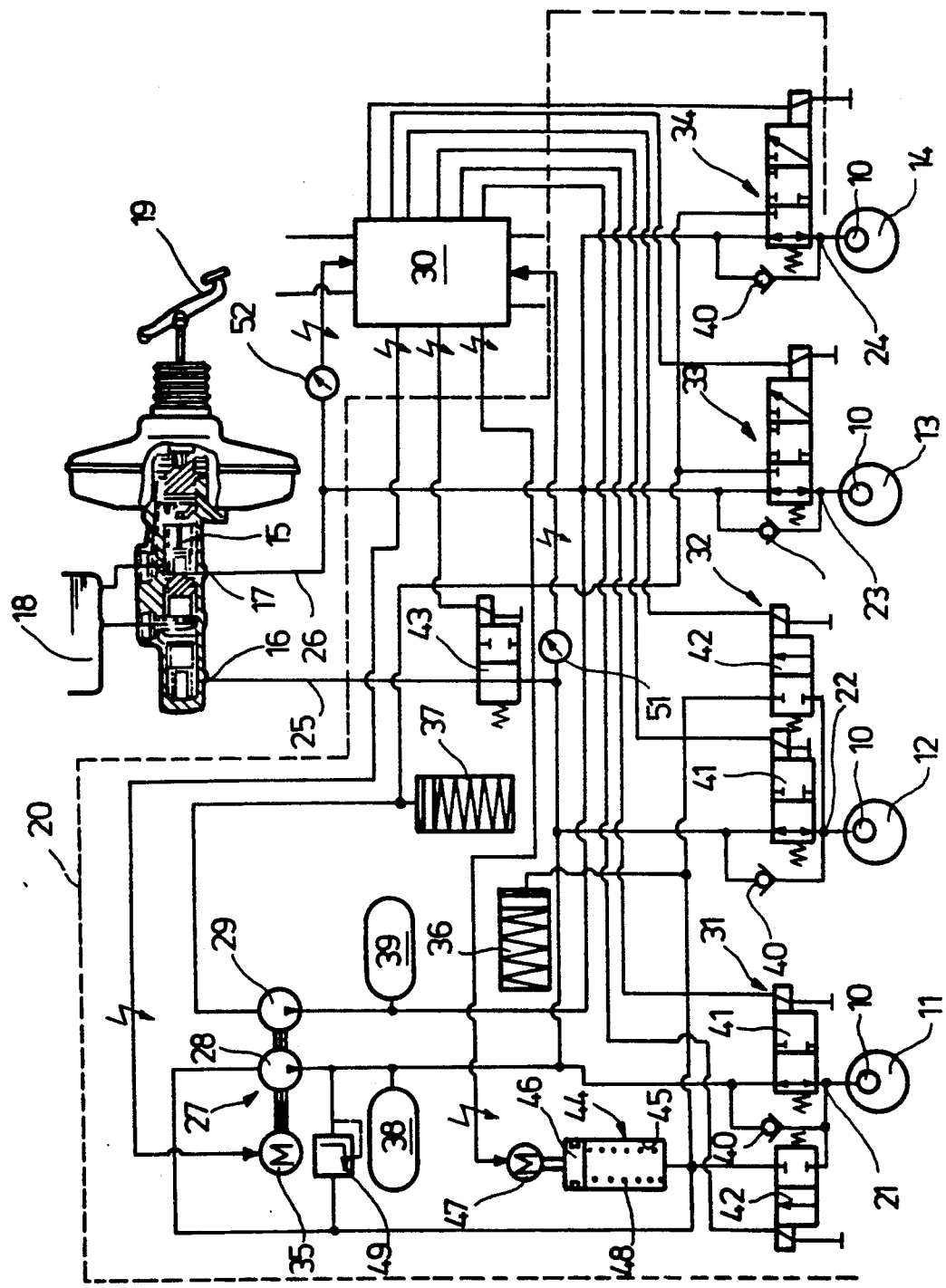

HYDRAULIC DUAL-CIRCUIT BRAKE SYSTEM WITH DUAL PRESSURE SENSORS AND AN ACTIVE FLUID RESERVOIR

This is a continuation of copending application Ser. No. 07/674,805 filed on Mar. 25, 1991, now abandoned.

BACKGROUND OF THE INVENTION

The invention is based on a hydraulic dual-circuit brake system with an anti-skid system (ABS) and traction control (ASR) for motor vehicles, as defined hereinafter. Such a brake system is known from German Patent 38 00 854 now U.S. Pat. No. 4,846,532. Here, the pump feed apparatus for ASR operation is embodied by a vacuum cell and a switch valve, which in the ASR mode connects the vacuum cell pressure chamber to the inlet of the return pump element that is associated with the brake circuit of the driven wheels of the rear axle. By means of the charge pressure generated by the vacuum cell in the brake-fluid-filled pressure chamber, brake fluid is fed into the pump element, which in turn applies an approximately constant brake supply pressure to the control valves associated with the driven wheels. The brake pressure required in the wheel brake cylinder of a spinning wheel to brake it is adjusted by switching the associated control valve.

European Patent 0 062 246 discloses a dual-circuit brake system with front-axle/rear-axle brake circuit distribution, which has an adaptor to distribute the brake force, fed by the master brake cylinder, to the wheels of the front and rear axles. The adaptor has a hydraulic actuating device that is controlled by a microprocessor such that upon braking, the brake pressure in the brake circuit of the rear axle is adjusted as a function of the brake pressure in the front axle brake circuit, such that the brake pressure in the rear axle brake circuit is always somewhat lower than a value obtained from a mathematical expression stored in the microprocessor. By means of this adaptor, the rear axle braking can be selected freely, in accordance with an ideal distribution between front and rear axle brake pressure, so that in every phase of driving, any unstable driving situations, such as those resulting from overbraking of the rear axle, are avoided.

OBJECT AND SUMMARY OF THE INVENTION

The dual-circuit brake circuit according to the invention, has an advantage that the device required for traction control is simultaneously used for brake force distribution in the front and rear axle brake circuits during normal braking. This makes for extensive savings on components. The hydraulic actuator apparatus for hydraulic brake force distribution required in the known dual circuit brake system, which entails relatively high production costs, can be dispensed with. The only added expense required beyond the traction control apparatus for traction control is for two pressure sensors and one electronic control system, the function of which can be integrated into the control unit for anti-skid control and traction control.

In a preferred embodiment of the invention, the pump feed apparatus has an active reservoir with a controllable reservoir pressure; the reservoir is connected to the inlet of the pump element assigned to the rear axle brake circuit, and its reservoir pressure predetermines the brake pressure fed into the rear wheel brake cylinders by the pump element via the opened control valves. With this embodiment of the pump feed apparatus as an active reservoir, it becomes unnecessary to modulate the brake pressure by clocking the control valves to adjust the brake pressure in the rear wheel brake cylinders. The necessary brake pressure is generated, in the magnitude required, by the return pump on the basis of the charge pressure determined by the reservoir. Except for the ABS mode, the control of the control valves in the brake circuit in the rear axle becomes simpler.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing is a block circuit diagram of a dual-circuit brake system with front-axle/rear-axle brake circuit distribution, an anti-skid system and traction control, for a passenger car.

DESCRIPTION OF THE PREFERRED EMBODIMENT

In the hydraulic dual-circuit brake system shown in the form of a block circuit diagram in the drawing, having front-axle/rear-axle or front/rear brake circuit distribution, an anti-skid system (ABS) and traction control (ASR), for a passenger car, the wheel brake cylinders 10 of the rear wheels 11, 12 are disposed in one brake circuit, and the wheel brake cylinders 10 of the front wheels 13, 14 are disposed in the other brake circuit. The rear wheels represent the driven wheels of the passenger car here. In a known manner, the dual-circuit brake system includes a master brake cylinder 15, which has two separate brake circuit outlets 16, 17 for connection to the rear and front axle brake circuits, respectively, and communicates with a brake fluid tank 18. Upon actuation of a brake pedal 19, an equally high brake pressure is fed by the master brake cylinder 15 to both brake circuit outlets 16, 17.

The dual-circuit brake system also includes a four-channel hydraulic unit 20, which has four outlet channels 21-24. Connected to each outlet channel 21-24 is one wheel brake cylinder 10 of the wheels 11-14. One control valve 31-34 is assigned to each outlet channel 21-24; these control valves are controlled by an electronic control system 30 and in ABS operation they build up a wheel-slip-dependent brake pressure in the associated wheel brake cylinders 10. A return pump 27, which is part of the four-channel hydraulic unit 20, has two pump elements 28, 29, which are driven in common by an electric motor 35. The pump elements 28, 29 serve to return brake fluid upon pressure reduction in the brakes during ABS operation and to generate a brake supply pressure for the rear wheels in traction control operation. One pump element 28, 29 each is operative in one brake circuit and can communicate on the inlet side, via the respective two control valves 31, 32 or 33, 34 assigned to the same brake circuit, with the wheel brake cylinders 10 of the vehicle wheels 11-14 and is connected on the outlet side to the associated brake circuit outlet 16 or 17 of the master brake cylinder 15, via one connecting line 25 and 26 each. One pump inlet and outlet valve are each respectively integrated into the pump elements 28, 29, in a known manner; for the sake of simplicity, they have not been shown here. One low-pressure reservoir 36 and 37, respectively, is connected to the inlet of each of the pump elements 28, 29, while a respective damping chamber 38, 39 communicates with the outlet side of the pump elements 28, 29.

The control valves 33, 34 in the front axle brake circuit are embodied as 3/3-way magnet valves with spring restoration. They are each connected by their first valve connection to a respective outlet channel 23, and 24, by their second valve connection to the connecting line 26, and by their third valve connection to the inlet of the associated pump element 29. In a known manner, the control valves 33, and 34 are embodied such that in their first, unexcited basic position, there is an unhindered passage from the connecting line 26 to the outlet channels 23, 24, as a result of which the brake pressure controlled by the master brake cylinder 15 at the brake circuit outlet 17 reaches the wheel brake cylinders 10 of the front wheels 13, 14. In the second, middle valve position, brought about by exciting the control valves 33, 34 with half the maximum current, this passage is interrupted and all the valve connections are blocked, so that the brake pressure built up in the wheel brake cylinders 10 is held constant. In the third, end valve position, which is established by exciting the valve with maximum current, the outlet channels 23 and 24 and thus the wheel brake cylinders 10 of the front wheels 13, 14 are connected to the inlet of the pump element 29, so that brake fluid can flow out of the wheel brake cylinders 10 into the low-pressure reservoirs 37, and then be pumped back to the master brake cylinder 15 by the pump element 29, via the connecting line 26.

The control valves 31, 32 in the rear axle brake circuit each comprise one inlet valve 41 and one outlet valve 42, each of them embodied as 2/2-way magnet valves with spring restoration. One connection each of the inlet valve 41 and outlet valve 42 communicates with the associated outlet channel 21 and 22, respectively, while the other connection of each inlet valve 41 is connected to the connecting line 25 to the master brake cylinder 15, and the other connection of each outlet valve 42 is connected to the inlet of the pump element 28. In their unexcited basic position, the inlet valves 41 are opened while in turn the outlet valves 42, in their unexcited basic position, are closed. One check valve 40, with a blocking direction toward the outlet channels 21-24, is connected parallel to all the control valves 31-34.

For traction control operation, a reversing valve 43, embodied as a 2/2-way magnet valve with spring restoration, is disposed in the connecting line 25, on the one hand, and on the other a brake fluid tank 44 is provided, which is connected to the inlet of the pump element 28. The brake fluid reservoir 44 is embodied as an active reservoir, the reservoir piston 46 of which, being displaceable in a reservoir cylinder 45, is driven by an electromotive drive 47 counter to the force of a reservoir spring 48. The electromotive drive 47, like the electric motor 35, of the return pump 27 is controlled by the control system 30. The charge pressure output to the pump element 28 by the activated brake fluid reservoir 44 in this process, at which brake fluid is fed into the pump element 28, is controllable. A pressure limiting valve 49 with an opening direction toward the pump inlet is connected to the outlet of the pump element 28. A rear axle brake pressure sensor 51 is connected to the rear axle brake circuit, and a front axle brake pressure sensor 52 is connected to the front axle brake circuit; on the pressure side, these sensors are each connected to the respective connecting line 25 or 26 from the master brake cylinder 15 to the respective brake circuits, and their electrical output signal is carried to the control system 30.

The mode of operation of the dual circuit brake system described is as follows:

Upon actuation of the brake pedal 19, a brake pressure dependent on the pedal travel is generated at the brake circuit outlets 16, 17 of the master brake cylinder 15; this pressure is fed into each brake circuits via the connecting line 25, 26. As soon as the front axle brake pressure sensor 52 applies an electrical brake pressure signal to the control system 30, the control system reverses the reversing valve 43, thus blocking the connecting line 25 and disconnecting the rear axle brake circuit from the brake circuit outlet 16 of the master brake cylinder 15. The return pump 27 is switched on at the same time, and the brake fluid reservoir 44 is activated by turn-on of the electric drive 47. The brake fluid reservoir 44 feeds brake fluid at charge pressure into the pump element 28, which in turn, via the opened inlet valves 41 of the two control valves 31, 32, builds up a brake pressure in the wheel brake cylinders 10 of the rear wheels 11, 12. The brake pressure generated in the rear axle brake circuit is detected by the rear axle brake pressure sensor 51 and fed to the control system 30 in the form of a brake pressure signal. As soon as this brake pressure signal corresponds to a set-point value, the brake fluid reservoir 44 is deactivated, and the brake pressure is thus held at that level. The set-point value is predetermined as a function of the brake pressure in the front axle brake circuit and is stored in memory in the control system 30. It may for instance correspond to the mathematical expression $$p_P = \sqrt{(p_A\, a/\beta + Qb/2H\beta)^2 + p_A\, a/\beta(Qa/H - p_A\, a/\beta)} - (p_A\, a/\beta + Qb/2H\beta)$$

given in European Patent 0.062.246 and can take into account Q is the total vehicle weight, H is the height above ground of the vehicle's center of gravity, a and b are the horizontal distances between the center of gravity of the vehicle weight and both the front and rear axles, a and $\beta$ are brake coefficients; Q, a, b being calculated and memorized by the microprocessor on the basis of the output signals from the load sensor 51 in a stationary condition of the vehicle.

If spinning occurs at one of the wheels 11-14 during brake pedal actuation, slip sensors, not shown here but each assigned to one wheel, detect this and report it to the control system 30. The control system triggers the control valve 33 34 assigned to the slipping wheel, or triggers the outlet valve 42 of the control valve 31, 32, and by suitable reversal effects a brake pressure buildup in the wheel brake cylinder 10 of the spinning wheel 11-14, until the spinning has been overcome (traction control mode).

If spinning occurs at one of the driven rear wheels 11, 12 when the brake pedal 19 is not actuated, this is again reported to the control system 30 by the associated slip sensors. The control system switches the reversing valve 43 over to its closing position, so that once again the rear axle brake circuit is disconnected from the master brake cylinder 15. At the same time, the return pump 27 is switched on and the brake fluid reservoir 44 is activated. The pump element 28 fed from the brake fluid reservoir 44 generates a brake pressure that is fed into the wheel brake cylinder 10 of whichever driven wheel 11, 12 is spinning (traction control mode) via the inlet valve 41 of that wheel. If only one rear wheel 11, 12 is spinning, then the inlet valve 41 of the control valve 31 or 32 assigned to the rear wheel 11 or 12 that is not spinning is switched over into its closing position, so that no brake pressure can build up in the wheel brake cylinder 10 of the rear wheel 11 or 12 that is not spinning. The brake pressure required in the wheel brake cylinder 10 is adjusted by the pump element 28 by suitably controlling the charge pressure of the brake fluid reservoir 44. Once the required brake pressure has been attained, the inlet valve 41 is switched over to its closing position, and the brake pressure fed into the wheel brake cylinder 10 is maintained. The pump element 28 pumps, via the pressure limiting valve 49. For pressure reduction, the outlet valve 42 is switched over to its open position. The brake fluid flowing out of the wheel brake cylinder 10 is received by the brake fluid reservoir 44.

The invention is not restricted to the exemplary embodiment described. For instance, the reservoir piston 46 of the brake fluid reservoir 44, embodied as an active reservoir, may also be driven for axial displacement by an electromagnet, compressed air or a vacuum. The control valve 33 and 34 in the front axle brake circuit can, like the control valves 31 and 32 in the rear axle brake circuit, each are embodied by one inlet valve and one outlet valve. As a result, only a single type of valve is necessary for the entire dual-circuit brake system. Dividing the control valves 31 and 32 into respective inlet valves 41 and 42 has the advantage that losses of brake fluid in the brake fluid reservoir 44 can be balanced out again by the master brake cylinder 15. To this end, with the inlet valve 41 in its basic position, the outlet valve 42 should be switched over, so that communication is established between the brake fluid reservoir 44 and the master brake cylinder 15 via the opened valves and the non-triggered reversing valve 43.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A hydraulic dual-circuit brake system including front and rear wheels each including a wheel brake cylinder with front-axle/rear-axle brake distribution, in which the wheels of the rear axle and the wheels of the front axle are each disposed in a respective first and second brake circuit; having an anti-skid system and traction control, for motor vehicles; comprising a master brake cylinder with first and second brake circuit outlets (15, 16) for controlling a brake pressure by brake pedal actuation; a four-channel hydraulic unit (20) connected to said first and second brake circuit outlets; first, second, third, and fourth outlet channels (21-24) distributed to said first and second brake circuits for connection of the wheel brake cylinders (10) of the vehicle wheels; first, second, thirds and fourth control valves, each of which is respectively assigned to said first, second, third and fourth outlet channels for controlling a wheel-slip-dependent brake pressure in the corresponding wheel brake cylinder, said first and second control valves connect via a connecting line of said first brake circuit with said first brake circuit outlet of the master brake cylinder and said third and fourth control valves connect via a connecting line of said second brake circuit with said second brake circuit outlet of said master brake cylinder, a return pump (27) having first and second separate pump elements (28, 29), said first pump element (28) is operative in said first brake circuit and said second pump element (29) is operative in said second brake circuit, for returning brake fluid upon a reduction of brake pressure in the wheel brake cylinders, an inlet side of said first pump element communicates via said first and second control valves with said first and second outlet channels belonging to said first brake circuit and an outlet side of said first pump element connects, via a connecting line, with the first brake circuit of the master brake cylinder, an inlet side of said second pump element communicates via said third and fourth control valves with said third and fourth outlet channels belonging to said second brake circuit and an outlet side of said second pump element connects via a connecting line with the second brake circuit of the master brake cylinder; a reversing valve (43) and a brake fluid reservoir (44) for supplying brake pressure to the first brake circuit in traction control, said reversing valve is disposed in the connecting line to the first brake circuit, which in traction control blocks the connecting line and disconnects the first brake circuit from the master brake cylinder, and said brake fluid reservoir (44) is directly connected with the input to the first pump element and upon activation feeds brake fluid into the first pump element (28) assigned to the first brake circuit, a first and second brake pressure sensor (51, 52), said first brake pressure sensor (51) has a pressure side directly connected to the first brake circuit between said reversing valve (43) and said first and second control valves and said second brake pressure sensor has a pressure side connected to said second brake circuit between said second brake circuit outlet (15) of the master brake cylinder and the third and fourth control valves, each of said first and second brake pressure sensors outputs an electrical brake pressure signal as an instantaneous brake pressure electrical input signal to an electric control system (30), said electrical control system includes separate electrical signal outlets that communicate with the reversing valve (43), the brake fluid reservoir (44), said return pump (27) and said control valves, said electric control system is embodied such that in response to a brake pressure signal from the second brake pressure sensor (52), said electric control system switches the reversing valve (43) over into its closing position, and switches on the return pump (27), and activates the brake fluid reservoir (44) at least until such time as a brake pressure signal output by the first brake pressure sensor (51) is equivalent to a set-point valve means, which is predetermined as a function of the brake pressure in the second brake circuit.

2. A brake system as defined by claim 1, in which said brake fluid reservoir (44) with a controllable reservoir pressure is connected to the inlet side of the pump element (28) disposed in the first brake circuit, and the reservoir pressure predetermines the magnitude of the brake pressure established by the first pump element (28) in the brake cylinders (10) of the rear wheels (11, 12) via the first and second opened control valves (31, 32).

3. A brake system as defined by claim 2, in which the first and second control valves (31, 32) are assigned to the first and second outlet channels for the wheel brake cylinders of the rear wheels (11, 12), each of said first and second control valves comprises one inlet valve and one outlet valve (41, 42), which are embodied as 2/2-way magnet valves with spring restoration, and that in traction control, to build up pressure in the wheel brake cylinders (10), the inlet valves (41) are opened and the outlet valves (42) are closed; to hold pressure, the inlet valves (41) and the outlet valves (42) are closed, and for pressure reduction, the inlet valves (41) are closed and the outlet valves (42) are opened; and that when the anti-skid system becomes operative, the inlet valves (41) are open continuously, while the outlet valves (42) are opened only for pressure reduction.

4. A brake system as defined by claim 3, in which when the brake pedal (19) is actuated, the brake pressure reservoir (44) includes an electromotive drive which is de-activated to hold the brake pressure.

* * * * *